United States Patent
Bedard et al.

(10) Patent No.: US 9,090,313 B2
(45) Date of Patent: Jul. 28, 2015

(54) SNOWMOBILE HAVING A FRONT SUSPENSION ASSEMBLY WITH AT LEAST ONE PROTRUSION

(75) Inventors: Yvon Bedard, Orford (CA); Jean-Francois Lambert, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 13/821,397

(22) PCT Filed: Sep. 30, 2010

(86) PCT No.: PCT/US2010/050816
§ 371 (c)(1),
(2), (4) Date: Mar. 7, 2013

(87) PCT Pub. No.: WO2012/044295
PCT Pub. Date: Apr. 5, 2012

(65) Prior Publication Data
US 2013/0175106 A1    Jul. 11, 2013

(51) Int. Cl.
*B62M 27/02*    (2006.01)
*B60G 3/20*    (2006.01)

(52) U.S. Cl.
CPC ............... *B62M 27/02* (2013.01); *B60G 3/20* (2013.01); *B62M 2027/026* (2013.01)

(58) Field of Classification Search
CPC .. B62M 27/02; B62M 2027/02; B62M 27/00; B60G 3/20
See application file for complete search history.

(56) References Cited

U.S. PATENT DOCUMENTS

| | | | |
|---|---|---|---|
| 5,722,673 A * | 3/1998 | Mauz | 280/93.511 |
| 6,224,075 B1 | 5/2001 | McIntyre | |
| 6,860,352 B2 * | 3/2005 | Mallette et al. | 180/182 |
| 7,410,182 B1 | 8/2008 | Giese et al. | |
| 7,581,609 B2 | 9/2009 | Kubota | |
| 7,779,946 B2 | 8/2010 | Okada et al. | |
| 8,302,721 B2 * | 11/2012 | Yoshihara et al. | 180/182 |
| 8,408,560 B2 * | 4/2013 | Kamioka et al. | 280/5.512 |
| 2005/0039961 A1 * | 2/2005 | Moriyama | 180/190 |
| 2005/0103547 A1 * | 5/2005 | Mallette et al. | 180/190 |
| 2006/0081407 A1 | 4/2006 | Vaisanen | |
| 2007/0193799 A1 * | 8/2007 | Yoshihara et al. | 180/182 |
| 2008/0173491 A1 | 7/2008 | Fecteau | |
| 2010/0059945 A1 | 3/2010 | Kuwabara | |
| 2011/0278083 A1 * | 11/2011 | Yoshihara et al. | 180/182 |

FOREIGN PATENT DOCUMENTS

| | | |
|---|---|---|
| CN | 101229817 A | 7/2008 |
| RU | 2416542 C2 | 6/2010 |

OTHER PUBLICATIONS

English abstract of CN 101229817; retrieved from http://worldwide.espacenet.com/ on Jun. 10, 2015.

* cited by examiner

*Primary Examiner* — Joseph Rocca
*Assistant Examiner* — Marlon Arce
(74) *Attorney, Agent, or Firm* — BCF LLP

(57) ABSTRACT

A snowmobile has a front suspension and ski assembly having a right side and a left side. The right and left sides each have an upper arm, a lower arm and a spindle. A ski is connected to the lower portion of each spindle. At least one of the upper arms has a least one protrusion extending therefrom.

10 Claims, 5 Drawing Sheets

SNOWMOBILE HAVING A FRONT SUSPENSION ASSEMBLY WITH AT LEAST ONE PROTRUSION

FIELD OF THE INVENTION

The present invention relates generally a snowmobile having a front suspension with at least one protrusion.

BACKGROUND

Typically, snowmobiles include two skis at the front for steering the vehicle and supporting it on the snow. Each ski is connected to the vehicle through a suspension assembly.

One common type of front suspension assembly for connecting the front skis to the frame of the snowmobile comprises an upper and a lower A-arm. The proximal end of each of the upper and lower A-arm is usually rotatably connected to the snowmobile frame while their respective distal ends are pivotally connected to a spindle. In such a case, the upper portion of the spindle is pivotally connected to the distal end of the upper A-arm through a first ball joint and sleeve assembly and the mid-portion of the spindle is pivotally connected to the distal end of the lower A-arm through a second ball joint and sleeve assembly. The lower portion of the spindle is rotatably connected to one of the front skis.

In various circumstances, a snowmobile can get stuck with one side sunk in the snow. During use, the snowmobile will frequently sink unevenly in soft snow and can eventually end up stuck tilted to one side, making it difficult for the user to force the snowmobile out of the snow using the snowmobile's own propelling capabilities. To return the snowmobile back to an appropriate horizontal riding position, the user has to upright it using his own weight to create a moment. In order to do this, the user can put a foot on one of the snowmobile's footrest and pull on the snowmobile's handlebar. However, since the snowmobile's footrests are relatively close to its longitudinal centerline, applying the user's weight to it may not create a sufficient moment and the user may not be successful in his attempt to return the snowmobile to a driving position. Alternatively, users can put a foot and apply their weight to either one of the snowmobile's front skis or one of the upper A-arms of the front suspension assembly which are disposed further from the snowmobile's longitudinal centerline. However, applying a user's weight to one of the front skis or A-arms of the suspension assembly can also prove ineffective. The skis are rotatably connected to the suspension assembly and pivot when the user puts his foot on it. The upper A-arm of the front suspension assembly is generally made of tubular metal components presenting relatively smooth curved surfaces. The ball joint and sleeve assembly connecting the upper A-arm to the spindle has the ball joint protruding from the sleeve and therefore presents a relatively smooth and almost semi-spherical superior surface. Therefore, all the parts of the upper A-arm where the user could put his foot and apply his weight while pulling on the handlebar are relatively slippery. Current skis and upper A-arms are thus not adequate components to use in attempting to return the snowmobile to a driving position.

In view of the above, there is a need for a snowmobile component providing a gripping zone where the user can effectively place at least one foot and apply his weight in order to return an immobile snowmobile that has sunk on one of its side to a driving position.

SUMMARY

It is an object of the present invention to ameliorate at least some of the inconveniences present in the prior art.

It is another object of the present invention to provide a snowmobile with a front suspension assembly providing for a gripping zone where a user can effectively place at least one foot in order to create a moment to return the snowmobile to a driving position.

It is another object of the present invention to provide a snowmobile having a front suspension assembly with an upper arm having at least one protrusion to allow a user to effectively apply his weight to such upper arm using one of his feet when an immobile snowmobile is stuck on its side in order to create a moment to help return the snowmobile to a driving position.

In one aspect, a snowmobile is provided, the snowmobile comprising a frame having a front portion and a rear portion, a drive track disposed below the rear portion of the frame, an engine mounted on the frame, and a drive train operatively connecting the engine to the drive track for delivering propulsive power to the drive track. The snowmobile also comprises a front suspension assembly having a right side and a left side, and a pair of skis operatively connected to the right and left sides. Each of the right and left sides comprises an upper arm having at least one member, a distal end and a proximal end, the proximal end being operatively connected to the frame. Each of the right and left sides also comprises a lower arm operatively connected to the frame, and a spindle having an upper portion comprising a ball joint, a mid-portion operatively connected to the lower arm, and a lower portion operatively connected to a corresponding one of the pair of skis. The distal end of the upper arm comprises a sleeve, the sleeve receiving the ball joint therein, thereby connecting the upper portion of the spindle to the distal end of the upper arm. At least one of the right and left sides comprising at least one protrusion extending from the upper arm.

In an additional aspect, at least one protrusion extends generally vertically upwardly from the sleeve.

In a further aspect, for the at least one of the right and left sides comprising at least one protrusion, the ball joint has an uppermost point, and the at least one protrusion has a top edge, the top edge being vertically equal to or higher than a horizontal plane passing through the uppermost point of the ball joint.

In an additional aspect, the at least one protrusion extends from the at least one member.

In a further aspect, the at least one protrusion extends generally diagonally upwardly from the at least one member.

In an additional aspect, the at least one protrusion extends generally vertically from the at least one member.

In a further aspect, the at least one protrusion is at least one first protrusion, and at least one second protrusion extends from the at least one longitudinal member.

In another aspect, an upper arm for a front suspension assembly is provided, the front suspension assembly being adapted for connecting at least one ski to a frame of a snowmobile. The upper arm comprises at least one member and a distal end, a proximal end, the proximal end being adapted for connection to the frame. A sleeve is disposed at the distal end of the upper arm, and at least one protrusion extends from the upper arm.

In an additional aspect, the at least one protrusion extends generally vertically upwardly from the sleeve.

In a further aspect, the ball joint has an uppermost point, and the at least one protrusion has a top edge, the top edge being vertically equal to or higher than a horizontal plane passing through the uppermost point of the ball joint In an additional aspect, the at least one protrusion extends from the at least one member.

In a further aspect, the at least one protrusion extends generally diagonally upwardly from the at least one member.

In an additional aspect, the at least one protrusion extends generally vertically from the at least one member.

In a further aspect, the at least one protrusion is at least one first protrusion, and at least one second protrusion extends from the at least one longitudinal member.

For purposes of this application, terms used to locate elements on the vehicle or their spatial orientation, such as "forwardly", "rearwardly", "front", "back", "rear", "left", "right", "up", "down", "above", and "below", are as they would normally be understood by a rider of the vehicle sitting on the vehicle in a forwardly facing, driving position. The term "longitudinal" means extending from the front to the back. The terms "inner", "outer", "proximal" and "distal" are to be understood with regard to the longitudinal centerline of the vehicle.

Embodiments of the present invention each have at least one of the above-mentioned aspects and/or aspects, but not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DETAILED DESCRIPTION

Figure 1:
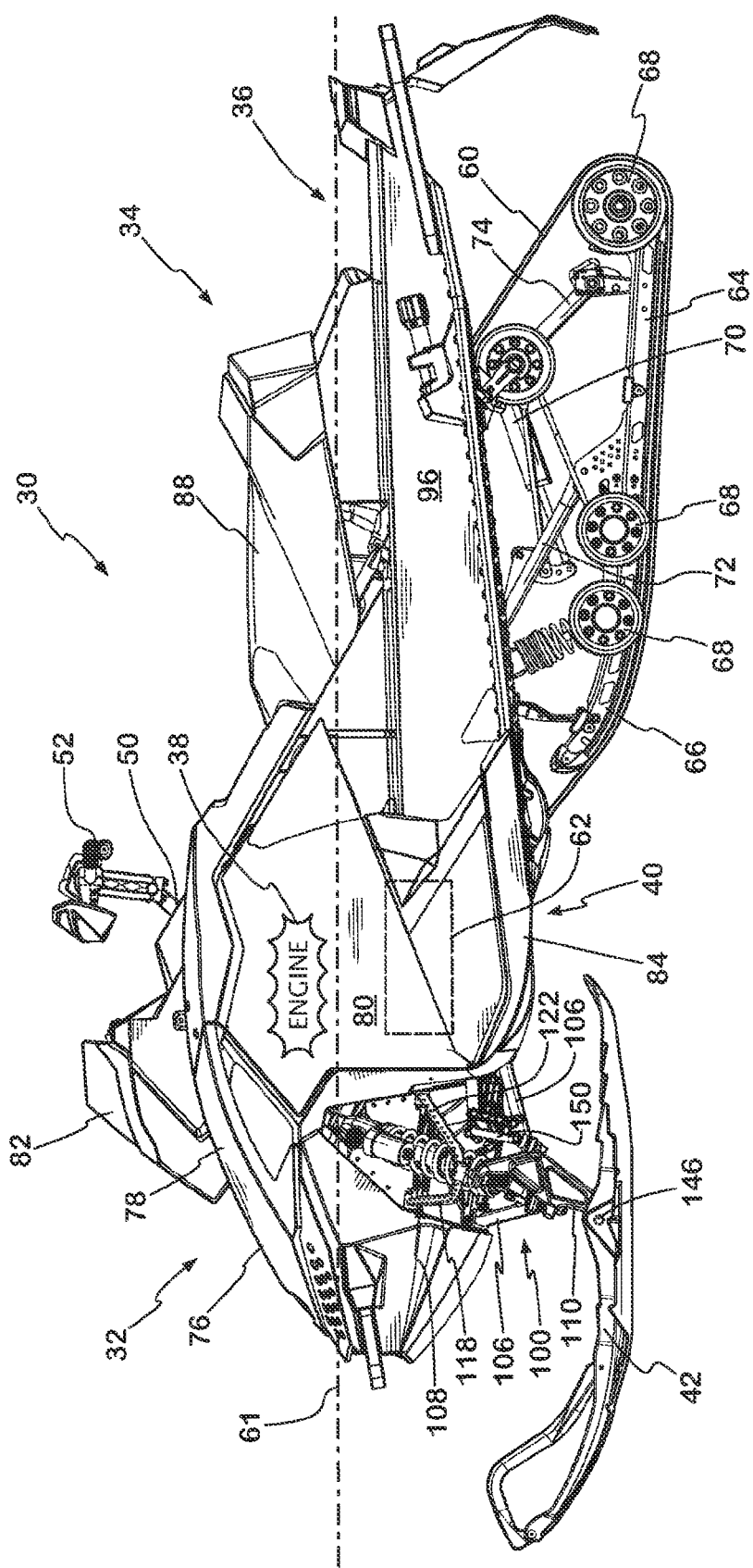
FIG. 1 is a left side elevation view of a snowmobile.

FIG. 1 illustrates the general construction of a snowmobile 30. The snowmobile 30 includes a forward end 32 and a rearward end 34 which are defined consistently with a forward travel direction of the vehicle. The snowmobile 30 includes a frame 36 comprising an engine cradle portion 40 and a tunnel 96. The tunnel 96 generally consists of an inverted U-shaped bent piece of sheet metal connected to the engine cradle portion 40 and which extends rearwardly along the longitudinal axis of the snowmobile 30. An engine 38, schematically illustrated, provides motive force for the snowmobile 30 and is carried by the engine cradle portion 40 of the frame 36.

Two front skis 42 are attached to the front portion of the frame 36 through a front suspension assembly 100. The front suspension assembly 100 is a double A-arm type suspension, having upper A-arms 108 and lower A-arms 106 on either side of the vehicle and linking spindles 110 to the frame 36. The spindles 110 are attached to the skis 42 at their lower ends and rotate left and right therewith. The spindles 110 are also connected to a steering column 50 via steering rods 150. The steering column 50 is attached at its upper end to a steering device such as a handlebar 52 which is positioned forward of a rider and slightly behind the engine 38 to rotate the skis 42, thereby providing directional control of the snowmobile 30. By turning the handlebar 52, the steering column 50 rotates, the spindles 110 are pivoted, and the skis 42 are turned to steer the snowmobile 30 in a desired direction.

An endless drive track 60, which provides traction to the snowmobile 30, is disposed under the tunnel 96 of the frame 36 with the upper portion of the drive track 60 accommodated within the tunnel 96. The endless drive track 60 is operatively connected to the engine 38 through a belt transmission system 62 which is schematically illustrated by broken lines. The drive train of the snowmobile 30 includes all the components of the snowmobile 30 whose function is to transmit power from the engine 38 to the ground. The endless drive track 60 is mounted to the tunnel 96 via a rear suspension assembly 64. The rear suspension assembly 64 includes rear suspension arms 72 and 74, a pair of slide rails 66 which generally position and guide the endless drive track 60 and idler wheels 68 engaged therewith. Rear suspension arms 72 and 74 connect the slide rails 66 and idler wheels 68 to the tunnel 96 of the frame 36. The slide rails 66 typically include a sliding lower surface made of polyethylene to reduce contact friction between the slide rails 66 and the drive track 60. The rear suspension assembly 64 also includes one or more shock absorbers 70 which may further include a coil spring (not shown) surrounding the individual shock absorbers 70.

At the forward end 32, the snowmobile 30 includes an external shell consisting of fairings 76 that enclose and protect the engine 38 and belt transmission system 62. Typically, the fairings 76 include a hood 78 and one or more side panels 80 which can be opened to allow access to the engine 38 and the belt transmission system 62 when this is required, for example, for inspection or maintenance. The side panels 80 can be opened away from the snowmobile 30 along a vertical axis, independently from the hood 78, which pivots forward about a horizontally extending axis. A windshield 82, which may be connected either to the fairings 76 or directly to the handlebars 52, acts as wind deflector to lessen the force of the air on the rider when the snowmobile is moving.

A straddle-type seat 88 is mounted onto the tunnel 96. Two footrests 84, extending outwardly from the tunnel 96, are positioned on either side of the straddle seat 88 to accommodate the rider's feet and provide a rigid platform for the rider to stand on when maneuvering the snowmobile 30.

Figure 2:
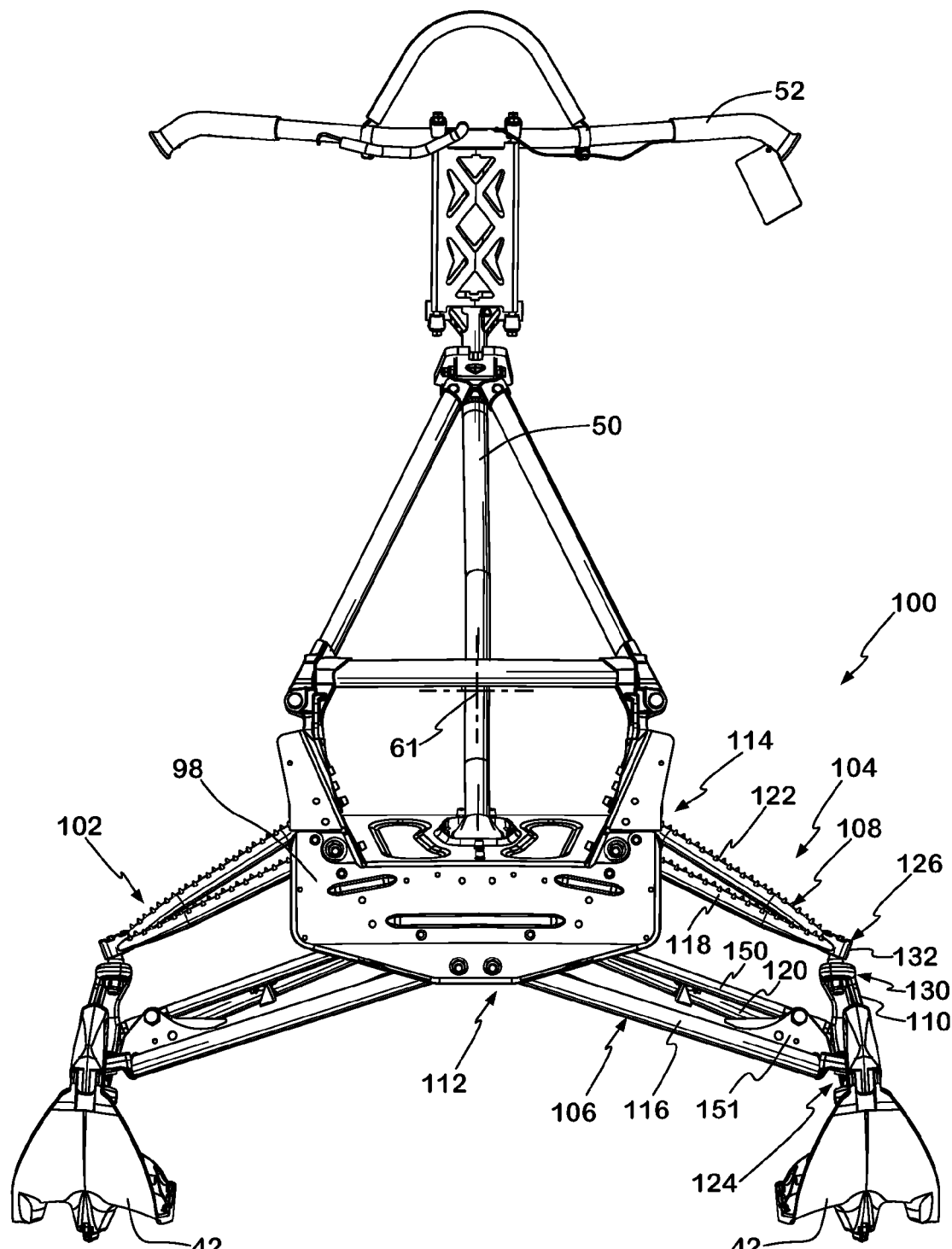
FIG. 2 is a front elevation view of an embodiment of a frame and front suspension and ski assembly of the snowmobile of FIG. 1.

With reference to FIG. 2, there is shown a front suspension assembly 100 of a snowmobile 30 mounted to the front portion 98 of frame 36 with all other components of the snowmobile removed for ease of reference and clarity. The front suspension assembly 100 includes a right side double A-arm assembly 102 and a left side double A-arm assembly 104. Since the right side and the left side double A-arm assemblies 102 and 104 are mirror images of each other, same reference numbers will be used for the components of the right and left double A-arm assemblies 102 and 104 with the understanding that both sides of the front suspension assembly 100 include similar components and operate in a similar fashion. In view of this, and for simplicity, only the left assembly 104 will be described in detail.

The left side double A-arm assembly 104 will now be described in more detail with reference to FIGS. 2 and 3. The left side double A-arm assembly 104 includes a lower A-arm 106, an upper A-arm 108 and a spindle 110. The proximal end 112 of the lower A-arm 106 is pivotally connected to the lower portion of the front portion 98 of frame 36, near the central longitudinal centerline 61 of the snowmobile 30. The proximal end 114 of the upper A-arm 108 is pivotally connected to the upper portion of the front portion 98 of frame 36. Each A-arm typically includes a front bar member 116, 118 and a rear bar member 120, 122. The front and rear bar members 116, 120 of the lower A-arm 106 are joined together at the distal end 124 of the lower A-arm 106. The front and rear bar members 118, 122 of the upper A-arm 108 are joined together at the distal end 126 of the upper A-arm 108. The distal ends 124, 126 of the lower A-arm 106 and upper A-arm 108 are pivotally connected to the spindle 110. At the proximal ends 112, 114 of the lower and upper A-arms 106, 108, their respective front 116, 118 and rear 120, 122 bar members are spaced apart thus forming a roughly triangular, "V" or "A" shape. Each A-arm 106, 108 has therefore two mounting points on the frame 36 and one joint on the spindle 110. "A-arm" is the term commonly used to designate a suspension arm having a roughly triangular, "V" or "A" shape. It is contemplated that other types or arms could be used.

The ski 42 is connected to the lower portion 144 of the spindle 110 via a pivot pin 146 such that the ski 42 can pivot about the pivot axis 148 to glide along and over bumps and follow the contours of the terrain when the snowmobile is moving. The distal end of the steering rod 150 is pivotally connected to the spindle 110 via a ball joint (not shown). The pivot pin 146 rigidly connects the ski 42 to the spindle 110 in all other directions such that the steering motion of the spindle 110 is transferred to the ski 42 to steer the snowmobile 30 when the steering column 50 and steering rod 150 are activated. The lower A-arm 106 also includes mounting brackets for a spring/shock absorber assembly 151.

Figure 5:
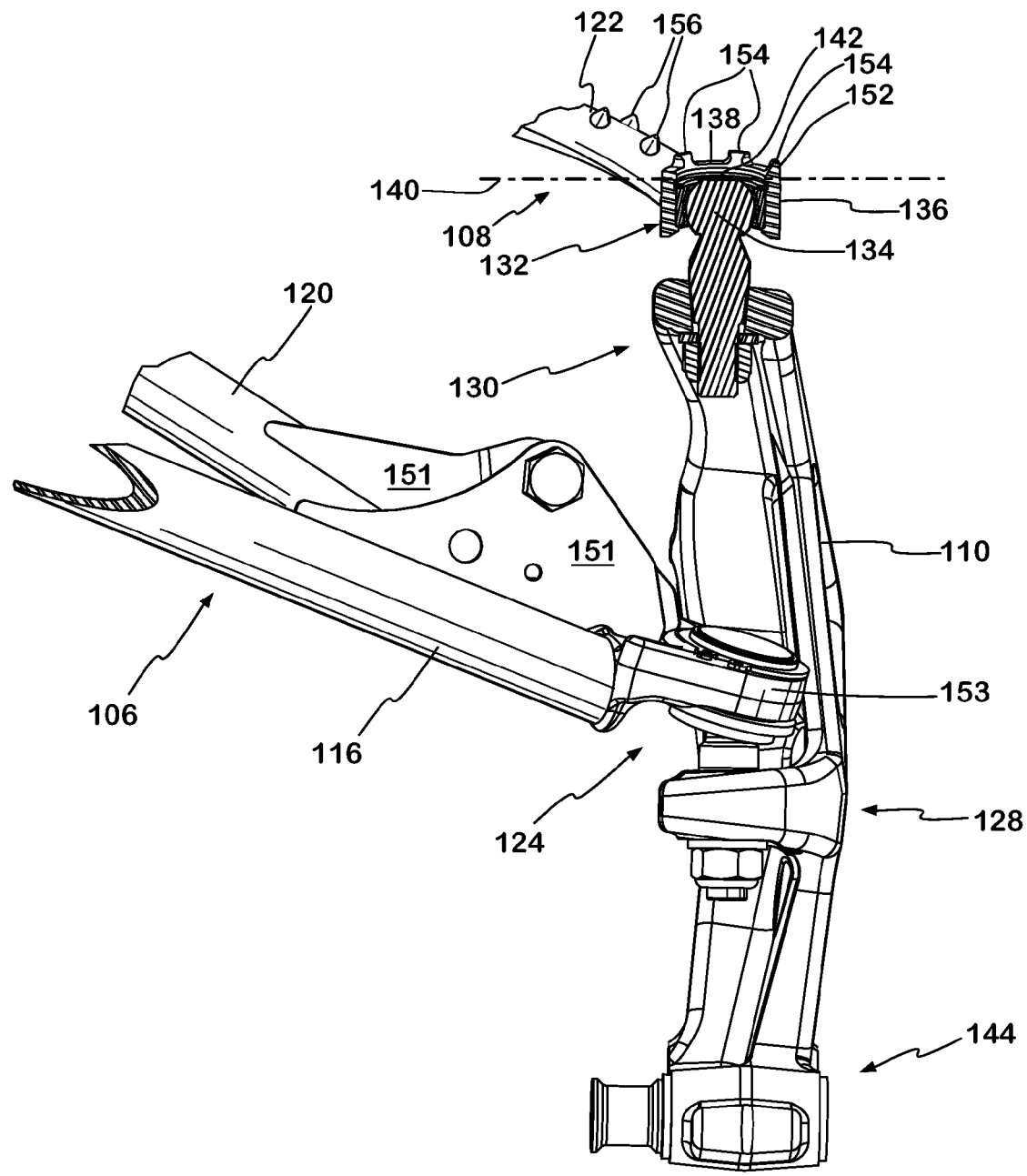
FIG. 5 is a partial cross-sectional view of a portion of the front suspension and ski assembly of FIG. 2 taken through line 5-5 of FIG. 3, with the ski removed for clarity.

The distal end 124 of the lower A-arm 106 is connected to the middle portion 128 of the spindle 110 via a first ball joint and sleeve assembly 153 (see FIG. 5). The distal end 126 of upper A-arm 108 is connected to the upper portion 130 of the spindle 110 via a second ball joint and sleeve assembly 132. The first ball joint and sleeve assembly 153 and the second ball joint and sleeve assembly 132 allow for rotational movement of the spindle 110 relative to the upper and lower A-arms 106, 108 about multiple axes such that the spindle 110 can rotate about a steering axis (not shown) passing through the first ball join and sleeve assembly 153 and the second ball joint and sleeve assembly 132, and can move up and down throughout the A-arms 106, 108 range of movement.

Figure 3:
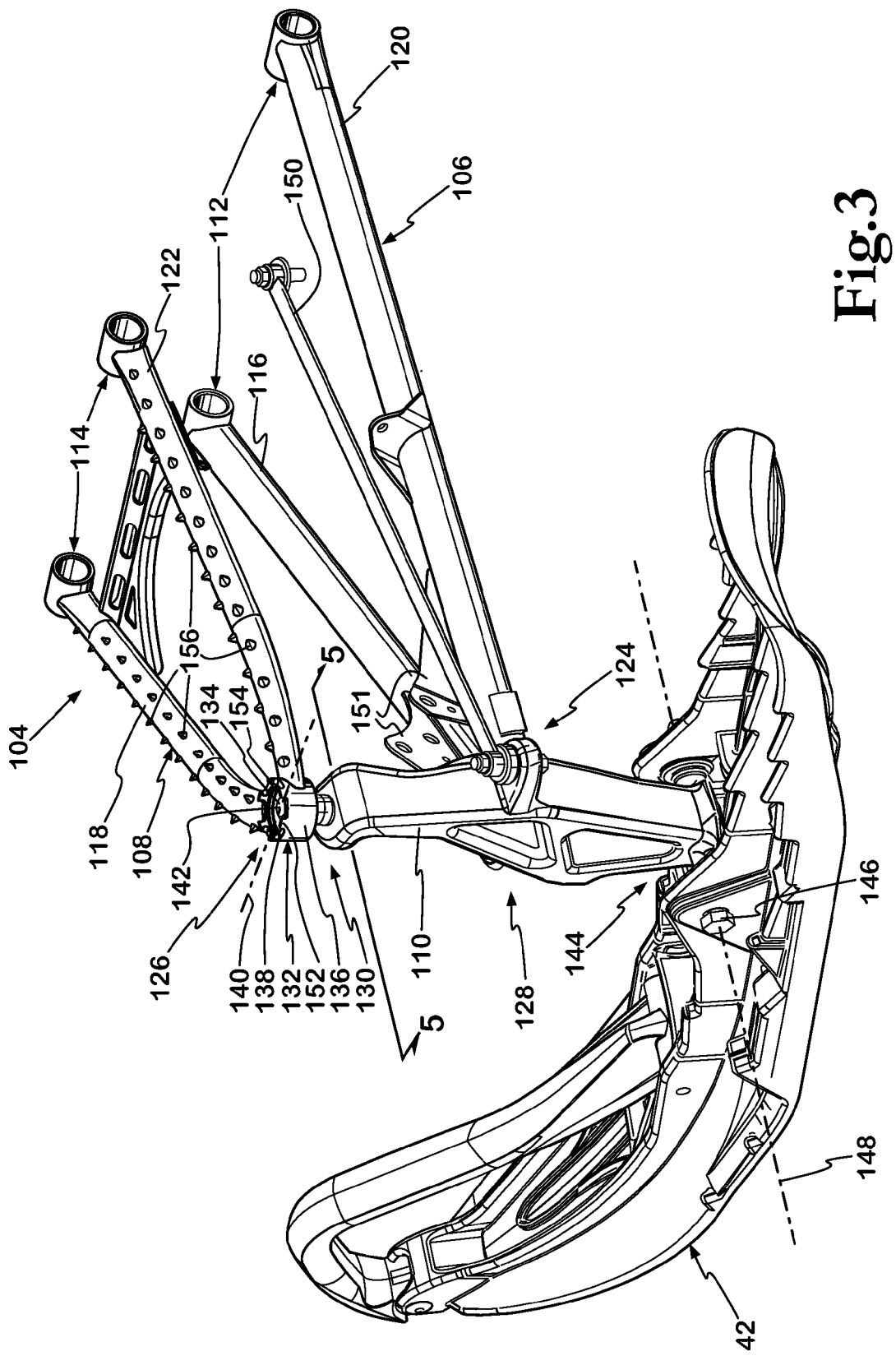
FIG. 3 is a perspective view taken from a rear left side of a left side of the front suspension and ski assembly of FIG. 2.

With reference to FIGS. 3 and 5, the second ball joint and sleeve assembly 132 comprises a ball joint 134 connected to the upper portion 130 of the spindle 110, and a sleeve 136 connected to the distal end 126 of the upper A-arm 108. The sleeve 136 is adapted to receive and partially enclose the ball joint 134 so as to form the ball joint and sleeve assembly 132. The sleeve 136 has a top edge 138 which is vertically higher than the horizontal plane 140 passing through the uppermost point 142 of the ball joint 134.

Figure 4:
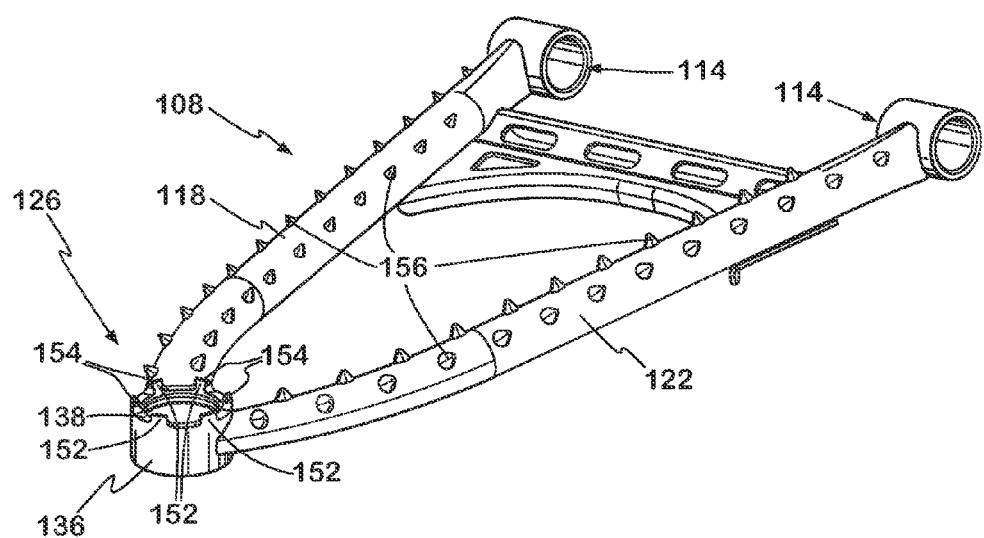
FIG. 4 is a perspective view taken from a rear left side of an upper A-arm of the front suspension and ski assembly of FIG. 3.

Now with reference to FIGS. 3, 4 and 5, it is shown that the sleeve 136 presents a first set of protrusions 152 extending vertically from the top edge 138 of the sleeve 136. Each protrusion 152 is generally rectangular and has a top edge 154. Protrusions 152 are spaced apart so as to allow the protrusions 152 to interlock with the protrusions forming the ground-facing surface of the sole of the snowmobile user's boot. In the embodiment of the front suspension assembly shown in FIGS. 3, 4 and 5 and as mentioned above, the top edge 138 of the sleeve 136 is vertically higher than the horizontal plane 140 passing through the uppermost point 142 of the ball joint 134. However, it should be understood that the top edge 138 of the sleeve 136 could also be equal to or vertically lower than the horizontal plane 140 passing through the uppermost point 142 of the ball joint 134 as long as the top edges 154 of the protrusions 152 are vertically higher than or equal to the horizontal plane 140 passing through the uppermost point 142 of the ball joint 134. It should also be understood that the protrusions 152 may have straight edges or may have any other shape or combination thereof, that would allow the protrusions 152 to interlock with the sole of a snowmobile user's boot, including but not limited to semi-circular, semi-spherical, and conical.

The upper A-arm 108 also has a second set of protrusions 156, extending diagonally upwardly from the front bar member 118 and rear bar member 122. The protrusions 156 are spaced apart so as to allow the protrusions 156 to interlock with the protrusions of the sole of the snowmobile user's boot. In this embodiment, each protrusion 156 has the shape of a cone and the protrusions 156 are disposed diagonally upwardly on the whole length of the front and rear bar members 118, 122. However, it should also be understood that the protrusions 156 may have straight edges or may have any other shape, or combination thereof, that would allow the protrusions 156 to interlock with the sole of a snowmobile user's boot, including but not limited to semi-circular, semi-spherical, cubical or rectangular. It should further be understood that protrusions 156 may be more or less spaced apart, disposed on only one or several parts of the front and/or rear bar members 118, 122, and may extent generally vertically and/or laterally from the front and/or rear bar members 118, 122 or according to different patterns including protrusions 156 disposed vertically, laterally and/or diagonally, as long as the protrusions 156 provide appropriate gripping for the snowmobile user to effectively place at least a foot and apply his weight to the upper A-arm 108.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:
1. A snowmobile comprising:
a frame having a front portion and a rear portion;
a drive track disposed below the rear portion of the frame;
an engine mounted on the frame;
a drive train operatively connecting the engine to the drive track for delivering propulsive power to the drive track;
a front suspension assembly having a right side and a left side,
a pair of skis operatively connected to the right and left sides,
each of the right and left sides comprising:
   an upper arm having at least one member, a distal end and a proximal end, the proximal end being operatively connected to the frame;
   a lower arm operatively connected to the frame;
   a spindle having an upper portion comprising a ball joint, a mid-portion operatively connected to the lower arm, and a lower portion operatively connected to a corresponding one of the pair of skis;

the distal end of the upper arm comprising a sleeve, the sleeve receiving the ball joint therein, thereby connecting the upper portion of the spindle to the distal end of the upper arm; and at least one of the right and left sides comprising at least one protrusion extending generally vertically upwardly from a top of the sleeve.

2. The snowmobile of claim 1, wherein for the at least one of the right and left sides comprising at least one protrusion:
the ball joint has an uppermost point; and
the at least one protrusion has a top edge, the top edge being vertically equal to or higher than a horizontal plane passing through the uppermost point of the ball joint.

3. The snowmobile of claim 1, wherein the at least one protrusion is at least one first protrusion, and further comprising at least one second protrusion extending from the at least one member.

4. The snowmobile of claim 3, wherein the at least one second protrusion extends generally diagonally upwardly from the at least one member.

5. The snowmobile of claim 3, wherein the at least one second protrusion extends generally vertically from the at least one member.

6. An upper arm for a front suspension assembly, the front suspension assembly being adapted for connecting at least one ski to a frame of a snowmobile, the upper arm comprising:

at least one member,
a distal end,
a proximal end,
the proximal end being adapted for connection to the frame of the snowmobile
a hollow sleeve fixedly connected to the distal end of the upper arm, and
at least one protrusion extending generally vertically upwardly from a top of the sleeve.

7. The upper arm of claim 6, wherein:
the sleeve is adapted to receive a ball joint of a spindle therein;
the ball joint has an uppermost point; and
the at least one protrusion has a top edge, the top edge being vertically equal to or higher than a horizontal plane passing through the uppermost point of the ball joint.

8. The upper arm of claim 6, wherein the at least one protrusion is at least one first protrusion, and further comprising at least one second protrusion extending from the at least one member.

9. The upper arm of claim 8, wherein the at least one second protrusion extends generally diagonally upwardly from the at least one member.

10. The upper arm of claim 8, wherein the at least one second protrusion extends generally vertically from the at least one member.

* * * * *